June 28, 1955 W. F. BERCK 2,711,657
VARIABLE RATIO TRANSMISSION
Filed Jan. 25, 1954 3 Sheets-Sheet 1
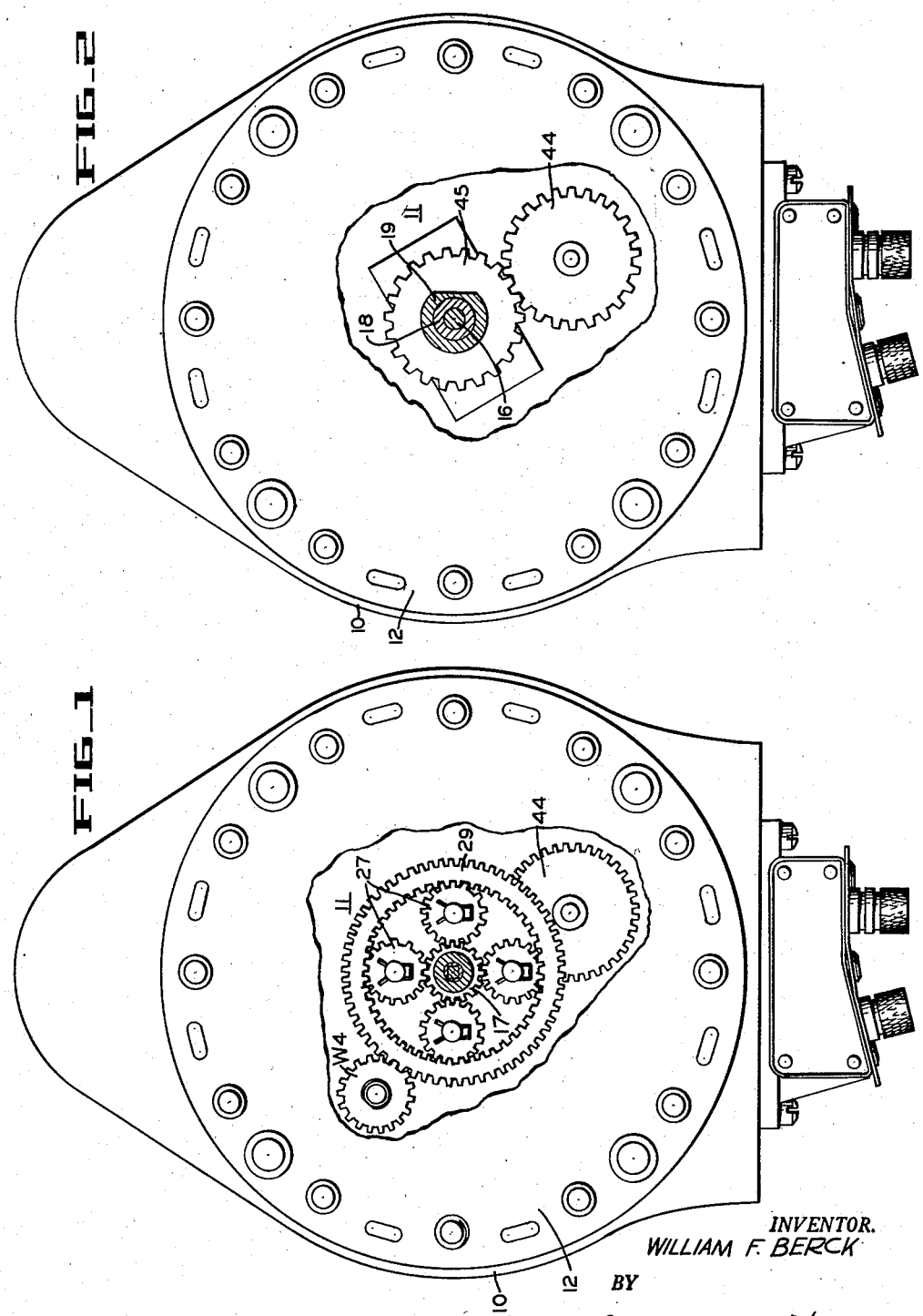
INVENTOR.
WILLIAM F. BERCK
BY
Mellin and Hanscom
ATTORNEYS June 28, 1955 W. F. BERCK 2,711,657
VARIABLE RATIO TRANSMISSION
Filed Jan. 25, 1954 3 Sheets-Sheet 2
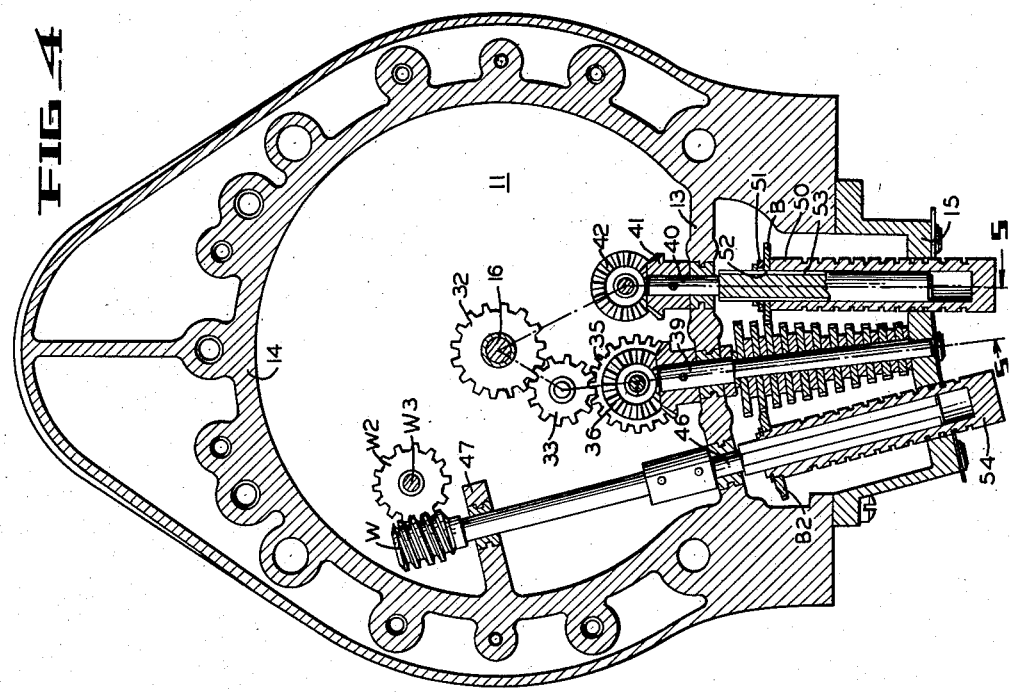
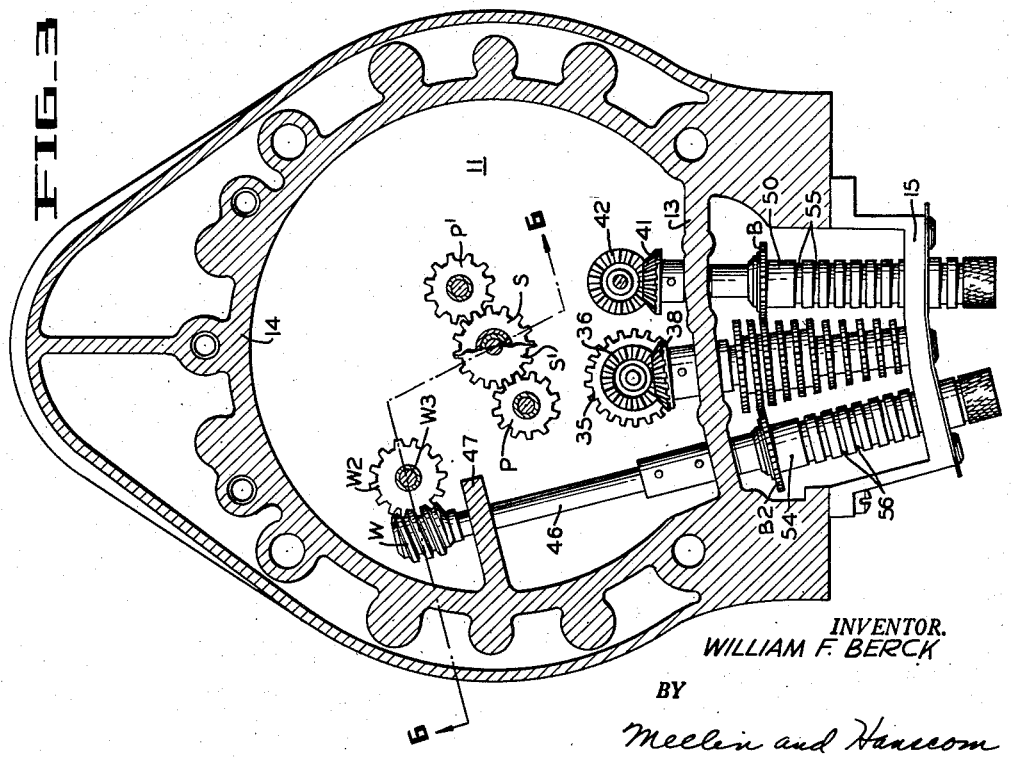
INVENTOR.
WILLIAM F. BERCK
BY
Meelin and Hancom
ATTORNEYS

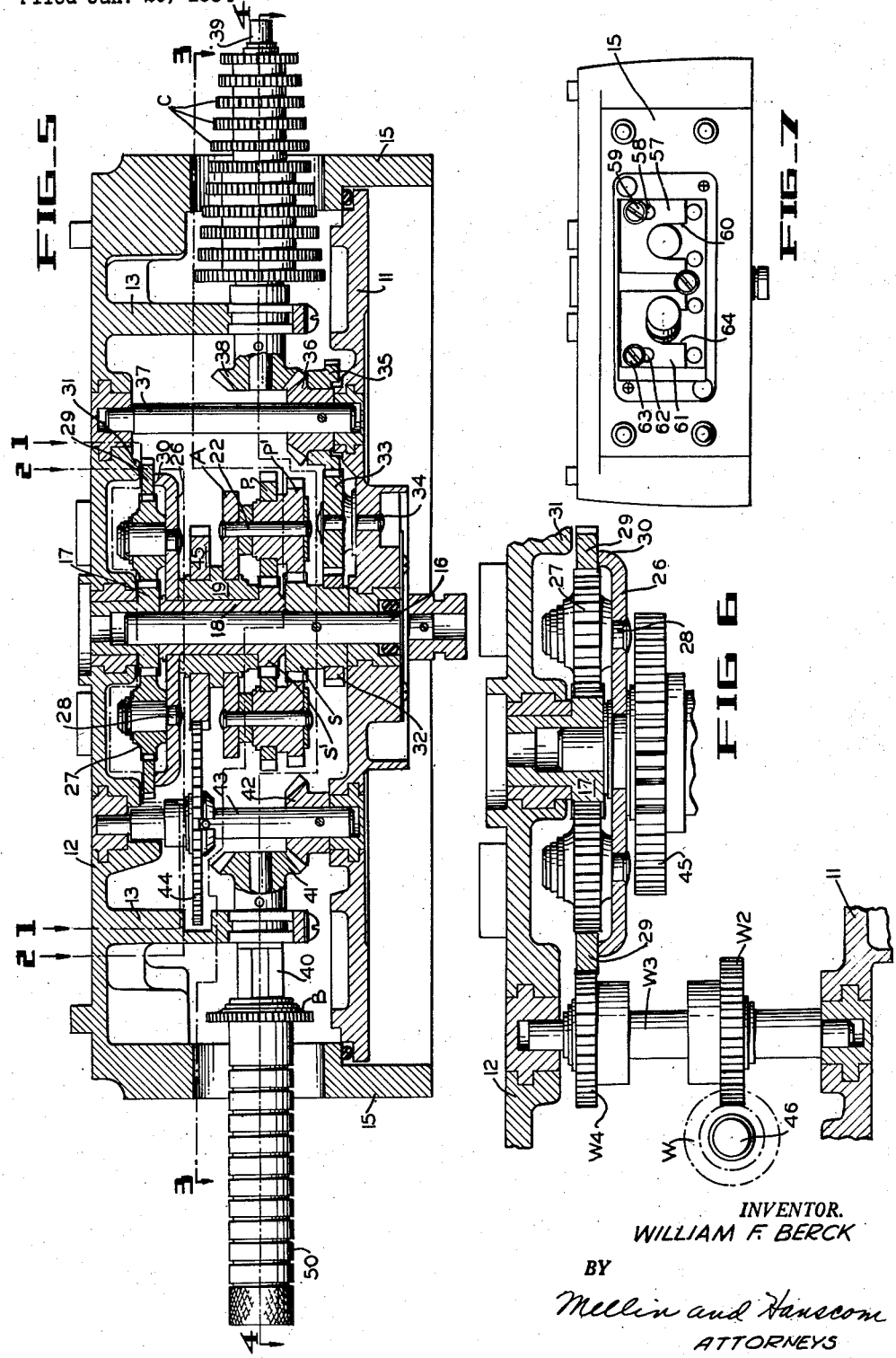

United States Patent Office 2,711,657
Patented June 28, 1955

2,711,657

VARIABLE RATIO TRANSMISSION

William F. Berck, Hayward, Calif., assignor to Ralph N. Brodie Company, San Leandro, Calif., a corporation of California Application January 25, 1954, Serial No. 405,737

3 Claims. (Cl. 74—681)

This invention relates to a transmission mechanism and, more particularly, to a planetary gear-type transmission capable of effecting exceedingly minute fractional variations of the ratio of transmission.

The transmission disclosed herein is similar to and is an improvement over that shown in my prior patent entitled "Variable Ratio Transmission Mechanism," No. 2,196,806, issued April 9, 1940.

The transmission mechanism disclosed in my prior patent and the transmission herein disclosed each basically is comprised of two change speed mechanism which may be selectively shifted and a double planetary transmission controlled by the output of said change speed mechanisms.

In the transmission mechanism disclosed in my prior patent, it was found that there were two principal sources of friction which tended to reduce the efficiency of the transmission as the output load was increased; namely, a ring gear common to the planet gears of two planetary systems and mounted on an overhung bearing, and the fact that various elements mounted on the central shaft turned at widely different rates of speed.

The principal object of this invention is to provide a variable ratio transmission mechanism capable of exceedingly minute fractional variations of the ratio of transmission wherein the internal friction is reduced to a minimum, thus increasing the output efficiency.

A further object of this invention is to provide a variable ratio transmission having a free floating ring gear which is in contact with only one set of planet gears.

Another object of this invention is to provide a variable ratio transmission wherein all of the elements mounted on the central shaft, with the exception of the output gear, rotate at approximately the same rate of speed.

One form which the invention may assume is exemplified in the following description and illustrated by way of example in the accompanying drawings, in which:

Fig. 1 is a plan view of a transmission unit embodying the principles of the present invention, a portion of the enclosing casing being broken away and certain parts being shown in section, the section being taken on line 1—1 of Fig. 5.

Fig. 2 is a view similar to that shown in Fig. 1 with the section being taken on line 2—2 of Fig. 5.

Fig. 3 is a sectional view taken on line 3—3 of Fig. 5.

Fig. 4 is a sectional view taken on line 4—4 of Fig. 5.

Fig. 5 is a schematic sectional view taken on line 5—5 of Fig. 4.

Fig. 6 is a schematic sectional view taken on line 6—6 of Fig. 3.

Fig. 7 is an end view of the device.

While the transmission mechanism herein disclosed may be employed in various situations, it will have a particular utility as a positive transmission means in situations wherein it is necessary to establish, between a drive and a driven element, an extremely accurate driving ratio which may be selectively varied in relatively minute fractional increments. My improved unit will be of exceptional value as a calibrating transmission means between the measuring mechanism and the counting or indicating mechanism of a meter.

The embodiment illustrated in the drawings includes a casing 10 which encloses the transmission mechanism and provides opposed relatively spaced parallel walls 11 and 12, the wall 12 being provided with a perpendicular bearing web 13 intermediate the end walls 14 and 15. An input drive shaft 16 extends through and is rotatably supported by the wall 11. The inner end of drive shaft 16 is rotatably supported within the hub of an output gear 17 which in turn is rotatably supported by the wall 12. A first sleeve 18 is rotatably mounted on drive shaft 16 and a second sleeve 19 is rotatably supported on said first sleeve.

A first sun gear S is fixedly mounted on input shaft 16 and meshes with a primary set of planet gears P′ rotatably mounted on pins 22 fastened to planet carrier A, which in turn is fixedly mounted on the second sleeve 19. A secondary set of planet gears P are each fixedly attached to one of the planet gears P′ and rotate therewith. Said secondary planet gears P are in mesh with and drive a second sun gear S′ formed integral with said first sleeve 18. Thus, the drive from said input shaft 16 is through sun gear S to planet gears P′ and from planet gears P fixedly attached thereto to sun gear S′, and the gear ratio between said input drive shaft 16 and the first sleeve 18 may be varied by varying the rotational speed of the second sleeve 19 and the planet carrier A attached thereto in a manner to be described hereinafter.

Fixedly mounted on said first sleeve 18 is a second planet carrier 26. A set of planet gears 27 are mounted on pins 28 fixed to said planet carrier 26 and mesh with output gear 17 and with internal teeth on a free floating ring gear 29. The ring gear 29 is supported by the planet gears 27 in the manner shown in Fig. 1. Lateral movement of the ring gear 29 in one direction is prevented by an inturned annular flange 30 on the end of planet carrier 26, and in the other direction by an annular boss 31 formed on the inner surface of wall 12. The drive from sleeve 18 through planet carrier 26 and planet gears 27 to output gear 17 may be varied by varying the rotational speed of the ring gear 29 in a manner also to be described hereinafter.

The means for varying the rotational speed of the second sleeve 19 comprises a drive gear 32 fixedly mounted on drive shaft 16 for rotation therewith. Gear 32 meshes with an idler gear 33 rotatably supported by a stub shaft 34 fixed to the casing wall 11. A gear 35 meshes with and is driven by idler gear 33. Gear 35 is mounted on and is rigidly connected to the hub of a bevel gear 36 mounted on a shaft 37 which in turn is rotatably supported at its ends by the casing walls 11 and 12. A second bevel gear 38 is secured to a cone shaft 39 rotatably journaled in the casing web 13 and end wall 15. The gear train comprising gears 32, 33, 35, 36 and 38 thus forms a driving connection between the drive shaft 16 and the cone shaft 39. The cone shaft 39 has splined or otherwise fixed thereto a plurality of cone gears C which are of progressively graduated sizes each one tooth larger than the next and in effect form a gear cone. For convenience, the individual gears on the cone C will be hereinafter referred to by C followed by the number of teeth thereon; for example, C21 will indicate the gear on cone C having 21 teeth.

Positioned at one side of the gear cone and disposed in parallel relation with the peripheries of the several cone gears is a primary shaft 40 which is journaled in the casing web 13 and has secured to its inner end a bevel gear 41 meshing with a companion bevel gear 42. The bevel gear 42 is fixedly attached to a shaft 43, the ends of which are journaled in casing walls 11 and 12. A gear 44, also fixedly attached to shaft 43, meshes with a gear 45 fixed to the second sleeve 19.

As best seen in Figs. 3 and 4, a secondary shaft 46 is disposed on the opposite side of the gear cone in a manner similar to the disposition of the primary shaft 40 on the other side of said cone and is journaled for rotation in the casing web 13 and a web 47 fixed to wall 14 of the casing.

Referring now to Fig. 6, a worm pinion W is attached to shaft 46 and meshes with a worm wheel W2 attached to a shaft W3 journaled for rotation in walls 11 and 12. A gear W4 is attached to shaft W3 and meshes with external teeth on ring gear 29.

Referring again now to Fig. 4, a primary gear B is mounted on shaft 40 and is in driving connection therewith. Gear B is also axially adjustable along shaft 40 to selectively mesh with any one of the cone gears C, and to this end said gear B is secured to the inner end of an elongated sleeve 50 which extends through an opening in the end wall 15 of the casing and is axially slidable on the shaft 40. The gear B may be secured on the sleeve 50 by any suitable means, such as a split snap ring 51 partly submerged in a circular groove formed in said sleeve, and said sleeve 50 and gear B are splined to rotate with the shaft 40 by means of a key tang 52 which projects radially inward from said gear B to pass through a slot provided in said sleeve 50 into a longitudinal keyway 53 formed in shaft 40.

A secondary gear B2 is mounted in a similar manner on an elongated sleeve 54 and is slidably splined to the secondary shaft 46. Sleeve 50 is provided with a series of relatively spaced circular grooves 55, and similarly sleeve 54 is provided with a series of circular grooves 56, that correspond in number and relative spacing with the several cone gears C comprising the gear cone.

As best seen in Fig. 7, a retaining plate 57 is mounted on the external surface of the casing wall 15, said plate being provided with an elongated slot 58 through which a clamp screw 59 projects and is screw-threaded into said wall 15 and functions to retain the plate 57 in an adjusted position. The lower edge of the retaining plate 57 is notched as at 60 to engage one of the circular grooves 55 on the sleeve 50 to retain said sleeve and its associated gear B in adjusted position.

Similarly, a second plate 61 is mounted on the external surface of wall 15 by clamp screw 63 extending through a slot 62. Said second plate 61 has a notch 64 adapted to engage the grooves 56 on the sleeve 54. With this arrangement, the clamp screws 59 and 63 may be loosened to permit elevation of the plates 57 and 61 to disengage the plates from the grooves 55 and 56, thus permitting the sleeves 50 and 54 to be axially adjusted to selectively mesh their respective gears B and B2 with the appropriate cone gears C, after which the plates 57 and 61 will again be lowered to engage in respective grooves 55 and 56 of the gear sleeves 50 and 54, and the clamp screws 59 and 63 will be tightened to maintain the plates against accidental displacement.

It will be noted that the cone gears C and the primary and secondary gears B and B2 provide a pre-selective speed change gearing of which the gear cone is the driving element and the gears B and B2 are the driven elements. It will further be noted that the gear cone is driven by the input shaft 16, through the gear train 32, 33, 35, 36 and 38, while the primary gear B, through gear train 41, 42, 55 and 45, drives second sleeve 19 and the gear B2, through the gear train W, W2 and 59, drives the ring gear 29.

The following analysis of the transmission will, for convenience, be divided into four parts and the input shaft 16 will be considered as rotating one revolution in a clockwise direction.

*Part I*

A primary planetary system is used of the type which does not employ a ring gear and consists of an input sun gear S fixed to shaft 16 and meshing with planet gears P' which are fixedly attached to planet gears P which in turn mesh with output sun gear S'. Planet gears P' and P rotate on studs 22 attached to planet arm A which is in turn attached to and rotates with sleeve 19 and gear 45. Gear 45 is driven by a gear train previously described through shaft 40. Gear B keyed to shaft 40 may be positioned to mesh with any gear C on shaft 39 and thus may impart a selected variable drive to gear 45, planet arm A and output sun gear S'.

The relative rotations of output sun gear S' of the above described primary planetary system may be determined by the use of the following formula: If rotation of A is one revolution clockwise, then $$\text{revolutions of } S' = 1 - \frac{SP}{S'P'}$$

If $S=18$ teeth, $S'=17$ teeth, $P'=16$ teeth and $P=17$ teeth, then $$\text{revolutions of } S' = 1 - \frac{18 \times 17}{17 \times 16} = 1 - \frac{9}{8} = -\frac{1}{8}$$

or ⅛ revolution counterclockwise.

Using the classical analysis of planetary gear trains, the results are tabulated below.

| | Rev. A | Rev. S | Rev. S' |
|---|---|---|---|
| Rotate A, S, S' one rev. clockwise. | 1 clockwise. | 1 clockwise. | 1 clockwise. |
| Rotate S one rev. counterclockwise. | 0 | 1 counterclockwise. | 1.125 counterclockwise. |
| Net Result | 1 clockwise. | 0 | .125 counterclockwise. |

Gear train from shaft 40 through gears 41, 42, 44 and 45 results in a one to one ratio. Therefore, revolutions of planet arm A agree with the revolutions of shaft 40 and gear B. In the above illustration gear B, which has 20 teeth, was meshed with gear C of 20 teeth. If gear B were meshed with gear C of 21 teeth, then one revolution clockwise of input shaft 16 would result in 1.05 revolutions of gear B and consequently 1.05 revolutions of planet arm A clockwise. An analysis of this combined drive would be:

| | Rev. A | Rev. S | Rev. S' |
|---|---|---|---|
| One rev. S clockwise. | 0 | 1 clockwise. | 1.125 clockwise. |
| 1.05 rev. A clockwise. | 1.05 clockwise. | 0 | .13125 counterclockwise. |
| Net Result | 1.05 clockwise. | 1 clockwise. | .99375 clockwise. |

If gear B meshes with gear C of 20 teeth and input shaft 16 rotates one revolution clockwise, the net result on sun gear S' would be one revolution clockwise. It will thus be seen that a one tooth change in gear C accomplishes .00625 increment of change in revolutions of output sun gear S'.

*Part II*

Fixed to sun gear S' is a planet arm 26 which carries studs 28 upon which planetary pinions 27 rotate freely. Pinions 27 mesh with ring gear 29 (internal) and output sun gear 17. Tooth values of these gears follow:

Pinion 27 = 16 teeth
Sun gear 17 = 16 teeth
Ring gear 29 = 48 teeth (internal)

The formula for the solution of this type of planetary system is stated thus; for one revolution of the planetary arm clockwise and with the ring gear stationary, revolutions of S clockwise $$= \frac{R+S}{S}$$

In terms of the number of teeth stated above revolution of sun gear 17

$$= \frac{48+16}{16} = 4$$

Thus, with ring gear 29 stationary and planet arm 26 driving one revolution clockwise, sun gear 17 will advance four revolutions clockwise.

If, as in a preceding illustration, variable drive gears B and C21 are engaged and sun gear S' rotates .99375 revolution clockwise per one revolution clockwise of input shaft 16, then the total revolutions of output sun gear 17 for one revolution clockwise of shaft 16 = .99375 × 4 or 3.975 revolutions clockwise. Since the meshing of B and C20 causes 4.0 revolutions clockwise, the increment of coarse change is 4.0-3.975 or .025 revolution in four revolutions or .00625 in one revolution.

Part III

Variable drive gear B2 which may be meshed with any gear C is keyed to and drives shaft 36, worm W, worm gear W2, shaft W3, pinion W4 and external teeth of ring gear 29. Tooth values of this gear train are as follows:

$W$ = one tooth (left hand)
$W2$ = 20 teeth
$W4$ = 18 teeth
$29$ = 60 teeth (external)

Therefore, one revolution of gear $B2 = 1/20 \times 18/60 = 3/200$ revolution of ring gear 29.

The formula for solving the type of planetary system described in Part II when the planet arm 26 is stationary, and the ring gear 29 is driving, is stated as follows:

Revolutions of $$S = \frac{R}{S}$$

In terms of the number of teeth on the gears revolution of $$S = \frac{48}{16} = 3$$

Thus for one revolution of ring gear 29 clockwise, output sun gear 17 will revolve three revolutions counterclockwise.

With gear B2 meshing with gear C20, if input shaft 16 turns one revolution clockwise, the result on output gear 17 is determined thus; $20/20 \times 1/20 \times 18/60 \times 3/1 = 9/200$ or .045 revolution counterclockwise.

The net result on output sun gear 17 for one revolution clockwise of input shaft 16, with gear B in mesh with gear C20 and gear B2 in mesh with C20 would be four revolutions clockwise due to the gear train comprising gears C20, B, 40, 41, 42, 43, 44, 45, A, S, P', P, S', 26, 29, and 28 minus .045 revolution counterclockwise due to the gear train comprising gears C20, B2, 46, W, W2, W3, W4, 29, and 28 or 3.955 revolutions clockwise.

If variable drive gears B2 and C21 are meshed and all other conditions are the same as in the preceding paragraph, the result of gear B2 and gear C21 alone on sun gear 17 would be $21/20 \times .045$ or .04725 revolution counterclockwise. The net result on sun gear 17 with B and C20 also driving would be 4.0 minus .04725 or 3.95275.

The difference between the net results in the two preceding paragraphs 3.955-3.95275 or .00225 divided by the normal output 4 allows an increment of fine change of .0005625.

Part IV

The ratio of output to input of this transmission then is always the result of the combined ratios of B to C, planetary system A, S, P', P, S' and planetary ssytem 26, 27, 29 and 17 minus the combined ratios of B2 to C, W to W2, and W4 to 29 and planetary system 29, 28 and 17. A simplified formula for these combined ratios may be stated as follows $$\frac{18000 - (100X + 9Y)}{4000}$$

in which $X$ = gear C in mesh with gear B and $Y$ = gear C in mesh with gear B2.

With the specific embodiment herein disclosed, it is possible to attain one hundred and twenty-one ratio changes between 3.898 to 1 and 4.173 to 1, with each progressive variation involving a very minute fraction of a revolution of the output shaft.

From the discussion above, it may be seen that when gear B meshes with gear C12, S' and sleeve 18 attached thereto will rotate 1.05 revolutions per 1 revolution of shaft 16; and sleeve 19 with planet arm A attached thereto will rotate .6 revolution per 1 revolution of shaft 16; when gear B meshes with gear C22, S' and sleeve 18 attached thereto will rotate .9875 revolution per 1 revolution of shaft 16, and sleeve 19 and planet arm A attached thereto will rotate 1.1 revolution per 1 revolution of shaft 16. Hence it should be noted that all of the elements mounted on shaft 16 rotate at approximately the same speed as the shaft throughout the variable range of the transmission.

It should further be noted that the ring gear 29 is supported solely by the planet pinions 27. Thus, there is no frictional contact between it and shaft 16 and further the ring gear meshes only with one set of planet gears.

While I have shown and described a preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a variable speed transmission, a drive shaft, a driven shaft in line with said drive shaft, a first sleeve revolubly carried by said drive shaft, a second sleeve revolubly carried by said first sleeve, a first sun gear fixed to said drive shaft, a second sun gear fixed to said first sleeve, a third sun gear fixed to said driven shaft, a first planet carrier fixed to said second sleeve, a first set of planet gears revolubly carried by said first planet carrier and meshing with said first sun gear, a second set of planet gears fixed to said first set and rotatable therewith meshing with said second sun gear, a second planet carrier fixed to said first sleeve and rotatable therewith, a third set of planet gears revolubly carried by said second planet carrier and meshing with said third sun gear, a free floating ring gear having internal teeth meshing with said third set of planet gears, change speed gearing for driving said second sleeve, change speed gearing for driving said ring gear, both of said change speed gearings being driven by said drive shaft and capable of being pre-selectively conditioned to drive said second sleeve and said ring gear at pre-selected speeds.

2. In a variable speed transmission, a drive shaft, a driven shaft in line with said drive shaft, a first sleeve revolubly carried by said drive shaft, a second sleeve revolubly carried by said first sleeve, a first sun gear fixed to said drive shaft, a second sun gear fixed to said first sleeve, a third sun gear fixed to said driven shaft, a first planet carrier fixed to said second sleeve, a first set of planet gears revolubly carried by said first planet carrier and meshing with said first sun gear, a second set of planet gears fixed to said first set and rotatable therewith meshing with said second sun gear, a second planet carrier fixed to said first sleeve and rotatable therewith, a third set of planet gears revolubly carried by said second planet carrier and meshing with said third sun gear, a free floating ring gear having internal teeth meshing with said third set of planet gears, a gear cone in driving connection with said drive shaft and comprising a plurality of stepped gears, a primary gear adapted for selective engagement with any one of said cone gears, a secondary gear adapted for selective engagement with any one of said cone gears, a driving connection between said primary gear and said second sleeve, and a driving connection between said secondary gear and said ring gear.

3. In a variable speed transmission, a drive shaft, a driven shaft in line with said drive shaft, a first sleeve revolubly carried by said drive shaft, a second sleeve revolubly carried by said first sleeve, a first sun gear fixed to said drive shaft, a second sun gear fixed to said first sleeve, a third sun gear fixed to said driven shaft, a first planet carrier fixed to said second sleeve, a first set of planet gears revolubly carried by said first planet carrier and meshing with said first sun gear, a second set of planet gears fixed to said first set and rotatable therewith meshing with said second sun gear, a second planet carrier fixed to said first sleeve and rotatable therewith, a third set of planet gears revolubly carried by said second planet carrier and meshing with said third sun gear, a free floating ring gear having internal teeth meshing with said third set of planet gears, a gear cone in driving connection with said drive shaft and comprising a plurality of stepped gears, a primary shaft in driving connection with said second sleeve, a secondary shaft in driving connection with said ring gear, a primary gear revoluble with said primary shaft and selectively shiftable thereon to intermesh with any one of said cone gears to change the speed of said second sleeve and a secondary gear revoluble with said secondary shaft and selectively shiftable thereon to intermesh with any one of said cone gears to change the speed of said ring gear.

References Cited in the file of this patent

UNITED STATES PATENTS

| | | |
|---|---|---|
| 1,282,495 | Tornberg | Oct. 22, 1918 |
| 2,178,229 | Hazard | Oct. 31, 1939 |
| 2,196,806 | Berck | Apr. 9, 1940 |
| 2,212,241 | Mayo | Aug. 20, 1940 |
| 2,465,190 | Berck | Mar. 22, 1949 |
| 2,473,157 | Lucia | June 14, 1949 |